United States Patent
Chambers et al.

(10) Patent No.: US 6,238,833 B1
(45) Date of Patent: May 29, 2001

(54) BINDER RESIN WITH REDUCED HYDROXYL CONTENT

(75) Inventors: John S. Chambers, Rochester; Huoy-Jen Yuh, Pittsford, both of NY (US); H. Bruce Goodbrand, Hamilton (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/387,962

(22) Filed: Sep. 1, 1999

(51) Int. Cl.$^7$ ...................................................... G03G 5/05
(52) U.S. Cl. ................................................. 430/96; 525/61
(58) Field of Search ............................ 430/96, 132, 134; 525/61

(56) References Cited

U.S. PATENT DOCUMENTS

| | | | |
|---|---|---|---|
| 5,324,615 | 6/1994 | Stegbauer et al. | 430/132 |
| 5,393,629 | 2/1995 | Nukada et al. | 430/76 |
| 5,418,099 | 5/1995 | Mayama et al. | 430/58 |
| 5,418,107 | 5/1995 | Nealey et al. | 430/132 |
| 5,571,647 | * | 11/1996 | Mishra et al. | 430/64 |
| 6,027,844 | * | 2/2000 | Nguyen et al. | 430/96 |

OTHER PUBLICATIONS

Monsanto Chemical Company brochure entitled "Butvar® Polyvinyl Butyral Resin Properties & Use" (35 pages; copyright date 1989.

* cited by examiner

Primary Examiner—John Goodrow
(74) Attorney, Agent, or Firm—Zosan S. Soong

(57) ABSTRACT

A composition including: a polymeric compound including a polyvinyl butyral moiety, an optional polyvinyl alcohol moiety, an optional polyvinyl acetate moiety, and a modified polyvinyl moiety of the formula

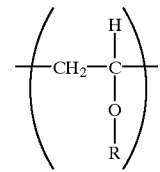

where R is an organic substituent, wherein the polyvinyl alcohol moiety has a hydroxyl content that ranges from 0% to about 5% by weight when —OR is an acetate.

14 Claims, 1 Drawing Sheet

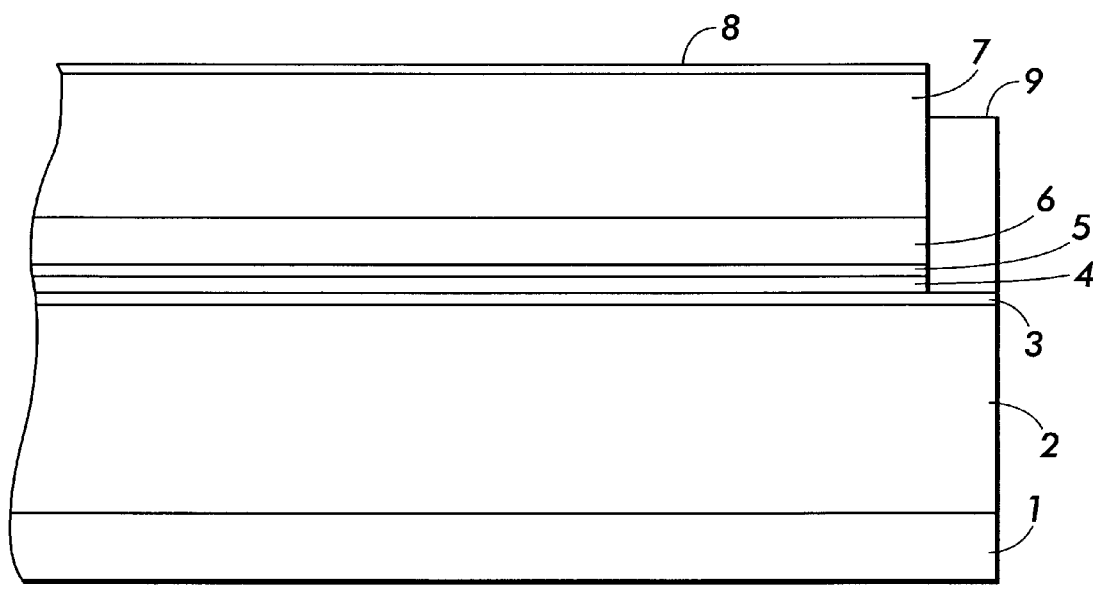

BINDER RESIN WITH REDUCED HYDROXYL CONTENT

FIELD OF THE INVENTION

This invention is directed to a composition useful for an imaging layer of a photoreceptor and to a method for preparing the composition.

BACKGROUND OF THE INVENTION

Conventional charge generating dispersions typically include a charge generating material, a binder, and a solvent. As the binder, polyvinyl butyral resins such as the BUTVAR® resins may be used. Polyvinyl butyral resins are preferred materials for the binder since they yield robust charge generating dispersions with excellent coating quality and long pot life. However, the present inventors are aware that the use of polyvinyl butyral resins for the binder in a charge generating layer can decrease the sensitivity of the resulting photoreceptor. Thus, there is a need, which the present invention addresses, for modified polyvinyl butyral resins that when employed as the binder in a charge generating layer enable an increase in photoreceptor sensitivity without sacrificing dispersion quality.

BUTVAR® resins are described in a brochure (35 pages; copyright date 1989) from Monsanto Chemical Company.

Photoreceptor coating compositions are disclosed in Nealey et al., U.S. Pat. No. 5,418,107; Stegbauer et al., U.S. Pat. No. 5,324,615; Nukada et al., U.S. Pat. No. 5,393,629; and Mayama et al., U.S. Pat. No. 5,418,099.

SUMMARY OF THE INVENTION

The present invention is accomplished in embodiments by providing a composition including: a polymeric compound including a polyvinyl butyral moiety, an optional polyvinyl alcohol moiety, an optional polyvinyl acetate moiety, and a modified polyvinyl moiety of the formula

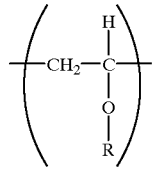

where R is an organic substituent, wherein the polyvinyl alcohol moiety has a hydroxyl content that ranges from 0% to about 5% by weight when —OR is an acetate.

There is also provided in embodiments a method comprising: selecting a polymer including a polyvinyl butyral moiety, a polyvinyl alcohol moiety, and an optional polyvinyl acetate moiety, wherein the polyvinyl alcohol moiety has a hydroxyl content of a first value, and decreasing the hydroxyl content to a lower second value that ranges from 0% by weight to less than the first value by reacting the polymer with a hydroxyl converting reactant to convert a portion of the repeating units of the polyvinyl alcohol moiety to a modified polyvinyl moiety of the formula

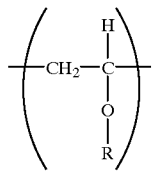

where R is an organic substituent, thereby resulting in a polymeric compound including the polyvinyl butyral moiety, the polyvinyl alcohol moiety having the hydroxyl content of the lower second value, the optional polyvinyl acetate moiety, and the modified polyvinyl moiety.

BRIEF DESCRIPTION OF THE DRAWINGS

The FIGURE is a cross-sectional view of a preferred multi-layer photoreceptor of the present invention.

DETAILED DESCRIPTION

A representative structure of an electrophotographic imaging member is shown in the FIGURE. This imaging member is provided with an anti-curl layer 1, a supporting substrate 2, an electrically conductive ground plane 3, a charge blocking layer 4, an adhesive layer 5, a charge generating layer 6, a charge transport layer 7, an overcoating layer 8, and a ground strip 9. The imaging member can be a photoreceptor.

The Anti-Curl Layer

For some applications, an optional anti-curl layer 1 can be provided, which comprises film-forming organic or inorganic polymers that are electrically insulating or slightly semi-conductive. The anti-curl layer provides flatness and/or abrasion resistance.

Anti-curl layer 1 can be formed at the back side of the substrate 2, opposite the imaging layers. The anti-curl layer may include, in addition to the film-forming resin, an adhesion promoter polyester additive. Examples of film-forming resins useful as the anti-curl layer include, but are not limited to, polyacrylate, polystyrene, poly(4,4'-isopropylidene diphenylcarbonate), poly(4,4'-cyclohexylidene diphenylcarbonate), mixtures thereof and the like.

Additives may be present in the anti-curl layer in the range of about 0.5 to about 40 weight percent of the anti-curl layer. Preferred additives include organic and inorganic particles which can further improve the wear resistance and/or provide charge relaxation property. Preferred organic particles include Teflon powder, carbon black, and graphite particles. Preferred inorganic particles include insulating and semiconducting metal oxide particles such as silica, zinc oxide, tin oxide and the like. Another semiconducting additive is the oxidized oligomer salts as described in U.S. Pat. No. 5,853,906. The preferred oligomer salts are oxidized N,N,N',N'-tetra-p-tolyl-4,4'-biphenyldiamine salt.

Typical adhesion promoters useful as additives include, but are not limited to, duPont 49,000 (duPont), Vitel PE-100, Vitel PE-200, Vitel PE-307 (Goodyear), mixtures thereof and the like. Usually from about 1 to about 15 weight percent adhesion promoter is selected for film-forming resin addition, based on the weight of the film-forming resin.

The thickness of the anti-curl layer is typically from about 3 micrometers to about 35 micrometers and, preferably, about 14 micrometers. However, thicknesses outside these ranges can be used. The anti-curl coating can be applied as a solution prepared by dissolving the film-forming resin and the adhesion promoter in a solvent such as methylene chloride. The solution may be applied to the rear surface of the supporting substrate (the side opposite the imaging layers) of the photoreceptor device, for example, by web coating or by other methods known in the art. Coating of the overcoat layer and the anti-curl layer can be accomplished simultaneously by web coating onto a mulilayer photoreceptor comprising a charge transport layer, charge generation layer, adhesive layer, blocking layer, ground plane and substrate. The wet film coating is then dried to produce the anti-curl layer 1.

The Supporting Substrate

As indicated above, the photoreceptors are prepared by first providing a substrate 2, i.e., a support. The substrate can be opaque or substantially transparent and can comprise any of numerous suitable materials having given required mechanical properties.

The substrate can comprise a layer of electrically non-conductive material or a layer of electrically conductive material, such as an inorganic or organic composition. If a non-conductive material is employed, it is necessary to provide an electrically conductive ground plane over such non-conductive material. If a conductive material is used as the substrate, a separate ground plane layer may not be necessary.

The substrate can be flexible or rigid and can have any of a number of different configurations, such as, for example, a sheet, a scroll, an endless flexible belt, a web, a cylinder, and the like. The photoreceptor may be coated on a rigid, opaque, conducting substrate, such as an aluminum drum.

Various resins can be used as electrically non-conducting materials, including, but not limited to, polyesters, polycarbonates, polyamides, polyurethanes, and the like. Such a substrate preferably comprises a commercially available biaxially oriented polyester known as MYLAR™, available from E. I. duPont de Nemours & Co., MELINEX™, available from ICI Americas Inc., or HOSTAPHAN™, available from American Hoechst Corporation. Other materials of which the substrate may be comprised include polymeric materials, such as polyvinyl fluoride, available as TEDLAR™ from E. I. duPont de Nemours & Co., polyethylene and polypropylene, available as MARLEX™ from Phillips Petroleum Company, polyphenylene sulfide, RYTON™ available from Phillips Petroleum Company, and polyimides, available as KAPTON™ from E. I. duPont de Nemours & Co. The photoreceptor can also be coated on an insulating plastic drum, provided a conducting ground plane has previously been coated on its surface, as described above. Such substrates can either be seamed or seamless.

When a conductive substrate is employed, any suitable conductive material can be used. For example, the conductive material can include, but is not limited to, metal flakes, powders or fibers, such as aluminum, titanium, nickel, chromium, brass, gold, stainless steel, carbon black, graphite, or the like, in a binder resin including metal oxides, sulfides, silicides, quaternary ammonium salt compositions, conductive polymers such as polyacetylene or its pyrolysis and molecular doped products, charge transfer complexes, and polyphenyl silane and molecular doped products from polyphenyl silane. A conducting plastic drum can be used, as well as the preferred conducting metal drum made from a material such as aluminum.

The preferred thickness of the substrate depends on numerous factors, including the required mechanical performance and economic considerations. The thickness of the substrate is typically within a range of from about 65 micrometers to about 150 micrometers, and preferably is from about 75 micrometers to about 125 micrometers for optimum flexibility and minimum induced surface bending stress when cycled around small diameter rollers, e.g., 19 mm diameter rollers. The substrate for a flexible belt can be of substantial thickness, for example, over 200 micrometers, or of minimum thickness, for example, less than 50 micrometers, provided there are no adverse effects on the final photoconductive device. Where a drum is used, the thickness should be sufficient to provide the necessary rigidity. This is usually about 1–6 mm.

The surface of the substrate to which a layer is to be applied is preferably cleaned to promote greater adhesion of such a layer. Cleaning can be effected, for example, by exposing the surface of the substrate layer to plasma discharge, ion bombardment, and the like. Other methods, such as solvent cleaning, can be used.

Regardless of any technique employed to form a metal layer, a thin layer of metal oxide generally forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer.

The Electrically Conductive Ground Plane

As stated above, photoreceptors prepared in accordance with the present invention comprise a substrate that is either electrically conductive or electrically non-conductive. When a non-conductive substrate is employed, an electrically conductive ground plane 3 must be employed, and the ground plane acts as the conductive layer. When a conductive substrate is employed, the substrate can act as the conductive layer, although a conductive ground plane may also be provided.

If an electrically conductive ground plane is used, it is positioned over the substrate. Suitable materials for the electrically conductive ground plane include, but are not limited to, aluminum, zirconium, niobium, tantalum, vanadium, hafnium, titanium, nickel, stainless steel, chromium, tungsten, molybdenum, copper, and the like, and mixtures and alloys thereof. In embodiments, aluminum, titanium, and zirconium are preferred.

The ground plane can be applied by known coating techniques, such as solution coating, vapor deposition, and sputtering. A preferred method of applying an electrically conductive ground plane is by vacuum deposition. Other suitable methods can also be used.

Preferred thicknesses of the ground plane are within a substantially wide range, depending on the optical transparency and flexibility desired for the electrophotoconductive member. Accordingly, for a flexible photoresponsive imaging device, the thickness of the conductive layer is preferably between about 20 angstroms and about 750 angstroms; more preferably, from about 50 angstroms to about 200 angstroms for an optimum combination of electrical conductivity, flexibility, and light transmission. However, the ground plane can, if desired, be opaque.

The Charge Blocking Layer

After deposition of any electrically conductive ground plane layer, a charge blocking layer 4 can be applied thereto.

Electron blocking layers for positively charged photoreceptors permit holes from the imaging surface of the photoreceptor to migrate toward the conductive layer. For negatively charged photoreceptors, any suitable hole blocking layer capable of forming a barrier to prevent hole injection from the conductive layer to the opposite photoconductive layer can be utilized.

If a blocking layer is employed, it is preferably positioned over the electrically conductive layer. The term "over," as used herein in connection with many different types of layers, should be understood as not being limited to instances wherein the layers are contiguous. Rather, the term refers to relative placement of the layers and encompasses the inclusion of unspecified intermediate layers.

The blocking layer 4 can include polymers, such as polyvinyl butyral, epoxy resins, polyesters, polysiloxanes, polyamides, polyurethanes, and the like; nitrogen-containing siloxanes or nitrogen-containing titanium compounds, such as trimethoxysilyl propyl ethylene diamine, N-beta(aminoethyl) gamma-aminopropyl trimethoxy silane, isopropyl 4-aminobenzene sulfonyl titanate, di(dodecylbenezene sulfonyl) titanate, isopropyl di(4-aminobenzoyl)isostearoyl titanate, isopropyl tri(N-ethyl amino) titanate, isopropyl trianthranil titanate, isopropyl tri(N,N-dimethyl-ethyl amino) titanate, titanium-4-amino benzene sulfonate oxyacetate, titanium 4-aminobenzoate isostearate oxyacetate, gamma-aminobutyl methyl dimethoxy silane, gamma-aminopropyl methyl dimethoxy silane, and gamma-aminopropyl trimethoxy silane, as disclosed in U.S. Pat. Nos. 4,338,387, 4,286,033, and 4,291,110.

A preferred hole blocking layer comprises a reaction product of a hydrolyzed silane or a mixture of hydrolyzed silanes and the oxidized surface of a metal ground plane layer. The oxidized surface inherently forms on the outer surface of most metal ground plane layers when exposed to air after deposition. This combination enhances electrical stability at low relative humidity. The hydrolyzed silanes can then be used as is well known in the art. For example, see U.S. Pat. No. 5,091,278 to Teuscher et al.

The blocking layer 4 should be continuous and can have a thickness of up to 2 micrometers depending on the type of material used.

However, the blocking layer preferably has a thickness of less than about 0.5 micrometer because greater thicknesses may lead to undesirably high residual voltage. A blocking layer between about 0.005 micrometer and about 0.3 micrometer is satisfactory for most applications because charge neutralization after the exposure step is facilitated and good electrical performance is achieved. A thickness between about 0.03 micrometer and about 0.06 micrometer is preferred for blocking layers for optimum electrical behavior.

The blocking layer 4 can be applied by any suitable technique, such as spraying, dip coating, draw bar coating, gravure coating, silk screening, air knife coating, reverse roll coating, vacuum deposition, chemical treatment, and the like. For convenience in obtaining thin layers, the blocking layer is preferably applied in the form of a dilute solution, with the solvent being removed after deposition of the coating by conventional techniques, such as by vacuum, heating, and the like. Generally, a weight ratio of blocking layer material and solvent of between about 0.5:100 to about 5.0:100 is satisfactory for spray coating.

The Adhesive Layer

An intermediate layer 5 between the blocking layer and the charge generating layer may, if desired, be provided to promote adhesion. However, in the present invention, a dip coated aluminum drum may be utilized without an adhesive layer.

Additionally, adhesive layers can be provided, if necessary, between any of the layers in the photoreceptors to ensure adhesion of any adjacent layers. Alternatively, or in addition, adhesive material can be incorporated into one or both of the respective layers to be adhered. Such optional adhesive layers preferably have thicknesses of about 0.001 micrometer to about 0.2 micrometer. Such an adhesive layer can be applied, for example, by dissolving adhesive material in an appropriate solvent, applying by hand, spraying, dip coating, draw bar coating, gravure coating, silk screening, air knife coating, vacuum deposition, chemical treatment, roll coating, wire wound rod coating, and the like, and drying to remove the solvent. Suitable adhesives include, for example, film-forming polymers, such as polyester, dupont 49,000 (available from E. I. duPont de Nemours & Co.), Vitel PE-100 (available from Goodyear Tire and Rubber Co.), polyvinyl butyral, polyvinyl pyrrolidone, polyurethane, polymethyl methacrylate, and the like.

The Imaging Layer(s)

In fabricating a photosensitive imaging member, a charge generating material (CGM) and a charge transport material (CTM) may be deposited onto the substrate surface either in a laminate type configuration where the CGM and CTM are in different layers or in a single layer configuration where the CGM and CTM are in the same layer along with a binder resin. The photoreceptors embodying the present invention can be prepared by applying over the electrically conductive layer the charge generation layer 6 and, optionally, a charge transport layer 7. In embodiments, the charge generation layer and, when present, the charge transport layer, may be applied in either order.

Illustrative organic photoconductive charge generating materials include azo pigments such as Sudan Red, Dian Blue, Janus Green B, and the like; quinone pigments such as Algol Yellow, Pyrene Quinone, Indanthrene Brilliant Violet RRP, and the like; quinocyanine pigments; perylene pigments such as benzimidazole perylene; indigo pigments such as indigo, thioindigo, and the like; bisbenzoimidazole pigments such as Indofast Orange, and the like; phthalocyanine pigments such as copper phthalocyanine, aluminochloro-phthalocyanine, hydroxygallium phthalocyanine, and the like; quinacridone pigments; or azulene compounds. Suitable inorganic photoconductive charge generating materials include for example cadium sulfide, cadmium sulfoselenide, cadmium selenide, crystalline and amorphous selenium, lead oxide and other chalcogenides. Alloys of selenium are encompassed by embodiments of the instant invention and include for instance selenium-arsenic, selenium-tellurium-arsenic, and selenium-tellurium.

Any suitable inactive resin binder material may be employed in the charge generating layer. Typical organic resinous binders include polycarbonates, acrylate polymers, methacrylate polymers, vinyl polymers, cellulose polymers, polyesters, polysiloxanes, polyamides, polyurethanes, epoxies, polyvinylacetals, and the like.

The above mentioned binder materials may be used in addition to the inventive polymeric compound in the charge generating layer.

The present polymeric compound, useful as a binder, is composed of the following four moieties:

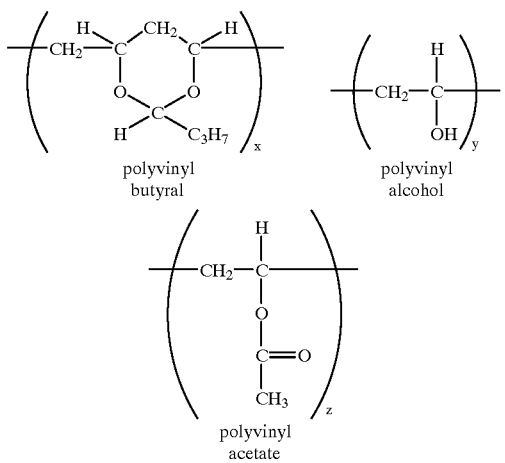

polyvinyl butyral polyvinyl alcohol polyvinyl acetate and a modified polyvinyl moiety of the formula

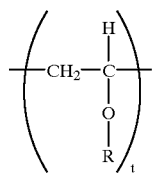

where R is an organic substituent, wherein the polyvinyl alcohol moiety has a hydroxyl content that ranges from 0% to about 5% by weight when —OR is an acetate.

R may be an alkyl group having from 1 to 6 carbon atoms either in a straight chain or branched; a tetrahydropyranyl group; or an acyl group of the formula —(CO)R' where R' has from 1 to 12 carbon atoms which may be an alkyl group in a straight chain or branched, or an aryl group. R is part of any reactant which is capable of reacting with hydroxyl. R may be selected to impart desirable attributes for any layer containing the present polymeric compound. For example, R may be selected to impart for instance enhanced interfacial adhesion for a charge generating layer containing the present polymeric compound.

In the above formula, x is a number such that the polyvinyl butyral moiety content ranges for example from about 75% to about 83% by weight, preferably about 80% by weight, based on the weight of the polymeric compound.

In the above formula, y is a number such that the polyvinyl alcohol moiety content (these values also represent the hydroxyl content) is for example above 0% by weight for all embodiments of R, preferably above 0% to about 5% by weight for all embodiments of R. In other embodiments, the hydroxyl content ranges from 0% to 5% by weight for all embodiments of R, preferably from 0% to about 1% by weight for all embodiments of R. As used herein, the recited values for the hydroxyl content are expressed as a percentage by weight of the polyvinyl alcohol moiety based on the weight of the polymeric compound.

In the above formula, z is a number such that the polyvinyl acetate moiety content ranges for example from 0 to about 8% by weight, preferably from 0 to about 2.5% by weight, based on the weight of the polymeric compound.

In the above formula, t is a number such that the modified polyvinyl moiety content ranges for example from about 1% to about 15% by weight, preferably from about 2% to about 10% by weight, based on the weight of the polymeric compound. Where —OR is the acetate, the modified polyvinyl moiety then has the same structure as the polyvinyl acetate moiety and the modified polyvinyl moiety content merges with the polyvinyl acetate moiety content. In embodiments, the modified polyvinyl moiety has a different structure from the polyvinyl acetate moiety.

The inventive polymeric compound has a molecular weight (weight average) ranging for example from about 40,000 to about 250,000. The polymeric compound may be present in the composition in an amount ranging for example from about 1% to about 8% by weight, based on the weight of the composition including a solvent.

To prepare the inventive polymeric compound, a preferred approach is to modify a conventional polyvinyl butyral resin. The method involves selecting the conventional polyvinyl butyral resin (referred herein as "polymer") including a polyvinyl butyral moiety, a polyvinyl alcohol moiety, and an optional polyvinyl acetate moiety, wherein the polyvinyl alcohol moiety has a hydroxyl content of a first value, and decreasing the hydroxyl content to a lower second value that ranges from 0% by weight to less than the first value by reacting the polymer with a hydroxyl converting reactant to convert a portion of the repeating units of the polyvinyl alcohol moiety to a modified polyvinyl moiety of the formula

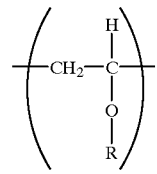

where R is an organic substituent described herein, thereby resulting in a polymeric compound including the polyvinyl butyral moiety, the polyvinyl alcohol moiety having the hydroxyl content of the lower second value, the optional polyvinyl acetate moiety, and the modified polyvinyl moiety.

Conventional polyvinyl butyral resins are available from Monsanto Chemical Company as BUTVAR® resins. Preferred BUTVAR® resins and their properties are identified in the following Table 1:

| Property | ASTM Method | B-72 | B-74 | B-73 | B-76 | B-79 |
|---|---|---|---|---|---|---|
| Molecular wt. (weight average in thousands) | (1) | 170–250 | 120–150 | 90–120 | 90–120 | 50–80 |
| *Hydroxyl content expressed as % polyvinyl alcohol | | 17.5–20.0 | 17.5–20.0 | 17.5–20.0 | 11.0–13.0 | 10.5–13.0 |
| Acetate content expressed as % polyvinyl acetate | | 0–2.5 | 0–2.5 | 0–2.5 | 0–1.5 | 0–1.5 |
| Butyral content expressed as % polyvinyl butyral, approx. | | 80 | 80 | 80 | 88 | 88 |

*Specification properties.

Also available as a conventional polyvinyl butyral resin is BM-S™ (sold by Sekisui Chemical Company) having a weight average of molecular weight of about 93,000 and composed of polyvinyl butyral moiety (believed to about 88% by weight based on the weight of the binder), a polyvinyl alcohol moiety, and a polyvinyl acetate moiety, where the polyvinyl alcohol moiety has a hydroxyl content believed to be about 8.7% by weight expressed as a percentage by weight of the polyvinyl alcohol moiety based on the weight of the binder.

Preferably, the conventional polyvinyl butyral resin to be modified contains a hydroxyl content of at least about 8% by weight, preferably from about 8% to about 20% by weight. For the conventional polyvinyl butyral resin ("polymer"), the recited values for the hydroxyl content are expressed as a percentage by weight of the polyvinyl alcohol moiety based on the weight of the polymer.

The hydroxyl converting reactant can be carboxylic acid anhydrides (e.g., acetic anhydride and butyric anhydride), carboxylic acid halides (e.g., acetyl chloride and butyryl chloride), dihydropyrans (e.g., 3,4-dihydro-2H-pyran), alkyl halides (e.g., butyl chloride, butyl bromide, and butyl iodide), or tosylates (p-toluenesulfonylchloride).

Any desired reduced hydroxyl content can be obtained by adjusting the reaction stoichiometry of the derivatizing agent (that is, the hydroxyl converting reactant). In general, slightly more than the theoretically required amount of derivatizing agent is added to reach any given hydroxyl content. For example, total derivatization of the hydroxyl content to acetate ester by acetic anhydride requires the addition of approximately 1.5 times the theoretically required amount of acetic anhydride.

To create a dispersion useful as a coating composition, a solvent is used with the inventive polymeric compound and the charge generating material. The solvent can be for example cyclohexanone, methyl ethyl ketone, tetrahydrofuran, alkyl acetate, and mixtures thereof. The alkyl acetate (such as butyl acetate and amyl acetate) can have from 3 to 5 carbon atoms in the alkyl group. The amount of solvent in the composition ranges for example from about 85% to about 98% by weight, based on the weight of the composition.

The amount of the charge generating material in the composition ranges for example from about 0.5% to about 5% by weight, based on the weight of the composition including a solvent. The amount of photoconductive particles (i.e, the charge generating material) dispersed in a dried photoconductive coating varies to some extent with the specific photoconductive pigment particles selected. For example, when phthalocyanine organic pigments such as titanyl phthalocyanine and metal-free phthalocyanine are utilized, satisfactory results are achieved when the dried photoconductive coating comprises between about 50 percent by weight and about 90 percent by weight of all phthalocyanine pigments based on the total weight of the dried photoconductive coating. Since the photoconductive characteristics are affected by the relative amount of pigment per square centimeter coated, a lower pigment loading may be utilized if the dried photoconductive coating layer is thicker. Conversely, higher pigment loadings are desirable where the dried photoconductive layer is to be thinner.

Generally, satisfactory results are achieved with an average photoconductive particle size of less than about 0.6 micrometer when the photoconductive coating is applied by dip coating. Preferably, the average photoconductive particle size is less than about 0.4 micrometer. Preferably, the photoconductive particle size is also less than the thickness of the dried photoconductive coating in which it is dispersed.

The weight ratio of the charge generating material ("CGM") to present polymeric compound ("binder") ranges from 40 (CGM):60 (binder) to 70 (CGM):30 (binder).

For multilayered photoreceptors comprising a charge generating layer (also referred herein as a photoconductive layer) and a charge transport layer, satisfactory results may be achieved with a dried photoconductive layer coating thickness of between about 0.1 micrometer and about 10 micrometers. Preferably, the photoconductive layer thickness is between about 0.2 micrometer and about 4 micrometers. However, these thicknesses also depend upon the pigment loading. Thus, higher pigment loadings permit the use of thinner photoconductive coatings. Thicknesses outside these ranges can be selected providing the objectives of the present invention are achieved.

Any suitable technique may be utilized to disperse the photoconductive particles in the binder and solvent of the coating composition. Typical dispersion techniques include, for example, ball milling, roll milling, milling in vertical attritors, sand milling, and the like. Typical milling times using a ball roll mill is between about 4 and about 6 days.

Charge transport materials include an organic polymer or non-polymeric material capable of supporting the injection of photoexcited holes or transporting electrons from the photoconductive material and allowing the transport of these holes or electrons through the organic layer to selectively dissipate a surface charge. Illustrative charge transport materials include for example a positive hole transporting material selected from compounds having in the main chain or the side chain a polycyclic aromatic ring such as anthracene, pyrene, phenanthrene, coronene, and the like, or a nitrogen-containing hetero ring such as indole, carbazole, oxazole, isoxazole, thiazole, imidazole, pyrazole, oxadiazole, pyrazoline, thiadiazole, triazole, and hydrazone compounds. Typical hole transport materials include electron donor materials, such as carbazole; N-ethyl carbazole; N-isopropyl carbazole; N-phenyl carbazole; tetraphenylpyrene; 1-methyl pyrene; perylene; chrysene; anthracene; tetraphene; 2-phenyl naphthalene; azopyrene; 1-ethyl pyrene; acetyl pyrene; 2,3-benzochrysene; 2,4-benzopyrene; 1,4-bromopyrene; poly (N-vinylcarbazole); poly(vinylpyrene); poly(-vinyltetraphene); poly(vinyltetracene) and poly (vinylperylene). Suitable electron transport materials include electron acceptors such as 2,4,7-trinitro-9-fluorenone; 2,4,5,7-tetranitro-fluorenone; dinitroanthracene; dinitroacridene; tetracyanopyrene and dinitroanthraquinone.

Any suitable inactive resin binder may be employed in the charge transport layer. Typical inactive resin binders soluble in methylene chloride include polycarbonate resin, polyvinylcarbazole, polyester, polyarylate, polystyrene, polyacrylate, polyether, polysulfone, and the like. Molecular weights can vary from about 20,000 to about 1,500,000.

Any suitable technique may be utilized to apply the charge transport layer and the charge generating layer to the substrate. Typical coating techniques include dip coating, roll coating, spray coating, rotary atomizers, and the like. The coating techniques may use a wide concentration of solids. Preferably, the solids content is between about 2 percent by weight and 8 percent by weight based on the total weight of the dispersion. The expression "solids" refers to the photoconductive pigment particles and binder components of the charge generating coating dispersion and to the charge transport particles and binder components of the charge transport coating dispersion. These solids concentrations are useful in dip coating, roll, spray coating, and the like. Generally, a more concentrated coating dispersion is preferred for roll coating. Drying of the deposited coating may be effected by any suitable conventional technique such as oven drying, infra-red radiation drying, air drying and the like. Generally, the thickness of the charge generating layer ranges from about 0.1 micrometer to about 3 micrometers and the thickness of the transport layer is between about 5 micrometers to about 100 micrometers, but thicknesses outside these ranges can also be used. In general, the ratio of the thickness of the charge transport layer to the charge generating layer is preferably maintained from about 2:1 to 200:1 and in some instances as great as 400:1.

The Overcoating Layer

Embodiments in accordance with the present invention can, optionally, further include an overcoating layer or layers 8, which, if employed, are positioned over the charge generation layer or over the charge transport layer. This layer comprises organic polymers or inorganic polymers that are electrically insulating or slightly semi-conductive.

Such a protective overcoating layer includes a film forming resin binder optionally doped with a charge transport material.

Any suitable film-forming inactive resin binder can be employed in the overcoating layer of the present invention. For example, the film forming binder can be any of a number of resins, such as polycarbonates, polyarylates, polystyrene, polysulfone, polyphenylene sulfide, polyetherimide, polyphenylene vinylene, and polyacrylate. The resin binder used in the overcoating layer can be the same or different from the resin binder used in the anti-curl layer or in any charge transport layer that may be present. The binder resin should preferably have a Young's modulus greater than about $2 \times 10^5$ psi, a break elongation no less than 10%, and a glass transition temperature greater than about 150 degrees C. The binder may further be a blend of binders. The preferred polymeric film forming binders include MAKROLON™, a polycarbonate resin having a weight average molecular weight of about 50,000 to about 100,000 available from Farbenfabriken Bayer A. G., 4,4'-cyclohexylidene diphenyl polycarbonate, available from Mitsubishi Chemicals, high molecular weight LEXAN™ 135, available from the General Electric Company, ARDEL™ polyarylate D-100, available from Union Carbide, and polymer blends of MAKROLON™ and the copolyester VITEL™ PE-100 or VITEL™ PE-200, available from Goodyear Tire and Rubber Co.

In embodiments, a range of about 1% by weight to about 10% by weight of the overcoating layer of VITEL™ copolymer is preferred in blending compositions, and, more preferably, about 3% by weight to about 7% by weight. Other polymers that can be used as resins in the overcoat layer include DUREL™ polyarylate from Celanese, polycarbonate copolymers LEXAN™ 3250, LEXAN™ PPC 4501, and LEXAN™ PPC 4701 from the General Electric Company, and CALIBRE™ from Dow. Additives may be present in the overcoating layer in the range of about 0.5 to about 40 weight percent of the overcoating layer. Preferred additives include organic and inorganic particles which can further improve the wear resistance and/or provide charge relaxation property. Preferred organic particles include Teflon powder, carbon black, and graphite particles. Preferred inorganic particles include insulating and semiconducting metal oxide particles such as silica, zinc oxide, tin oxide and the like. Another semiconducting additive is the oxidized oligomer salts as described in U.S. Pat. No. 5,853,906. The preferred oligomer salts are oxidized N,N,N',N'-tetra-p-tolyl-4,4'-biphenyldiamine salt.

The overcoating layer can be prepared by any suitable conventional technique and applied by any of a number of application methods. Typical application methods include, for example, hand coating, spray coating, web coating, dip coating and the like. Drying of the deposited coating can be effected by any suitable conventional techniques, such as oven drying, infrared radiation drying, air drying, and the like.

Overcoatings of from about 3 micrometers to about 7 micrometers are effective in preventing charge transport molecule leaching, crystallization, and charge transport layer cracking. Preferably, a layer having a thickness of from about 3 micrometers to about 5 micrometers is employed.

The Ground Strip

Ground strip 9 can comprise a film-forming binder and electrically conductive particles. Cellulose may be used to disperse the conductive particles. Any suitable electrically conductive particles can be used in the electrically conductive ground strip layer 9. The ground strip 9 can, for example, comprise materials that include those enumerated in U.S. Pat. No. 4,664,995. Typical electrically conductive particles include, but are not limited to, carbon black, graphite, copper, silver, gold, nickel, tantalum, chromium, zirconium, vanadium, niobium, indium tin oxide, and the like.

The electrically conductive particles can have any suitable shape. Typical shapes include irregular, granular, spherical, elliptical, cubic, flake, filament, and the like. Preferably, the electrically conductive particles should have a particle size less than the thickness of the electrically conductive ground strip layer to avoid an electrically conductive ground strip layer having an excessively irregular outer surface. An average particle size of less than about 10 micrometers generally avoids excessive protrusion of the electrically conductive particles at the outer surface of the dried ground strip layer and ensures relatively uniform dispersion of the particles through the matrix of the dried ground strip layer. Concentration of the conductive particles to be used in the ground strip depends on factors such as the conductivity of the specific conductive materials utilized.

In embodiments, the ground strip layer may have a thickness of from about 7 micrometers to about 42 micrometers and, preferably, from about 14 micrometers to about 27 micrometers.

The invention will now be described in detail with respect to specific preferred embodiments thereof, it being understood that these examples are intended to be illustrative only and the invention is not intended to be limited to the materials, conditions, or process parameters recited herein. All percentages and parts are by weight unless otherwise indicated.

EXAMPLE 1

A 6.6 g sample of Monsanto BUTVAR® B-79 (polyvinyl butyral resin) having 11.4 weight percent ("wt %") hydroxyl content was dissolved in 75 ml pyridine and treated with a 3 equivalent excess of acetic anhydride (12.8 g, 125 mmol). The reaction mixture was heated under a nitrogen atmosphere for 3 hours and then cooled to room temperature. The modified polyvinyl butyral resin (i.e, the inventive polymeric compound) was precipitated by addition to 1.5 liters of deionized water and filtered. After drying under vacuum, the inventive polymeric compound was taken up in 200 ml of warm tetrahydrofuran and reprecipitated into 1 liter of deionized water. Filtration then afforded the desired inventive polymeric compound. The degree of derivatization (i.e., converting the hydroxyl group of the polyvinyl alcohol moiety to an acetate group) was determined by the titrimetric method described by ASTM D1396-92, volume 06.03. The inventive polymeric compound had a hydroxyl content of 0.7 wt % which indicated almost complete derivatization.

A photoreceptor was prepared as follows.

A charge generating dispersion was composed of benzimidazole perylene (sublimed) and inventive polymeric compound at a weight ratio of 68 (perylene):32 (inventive polymeric compound) in n-butylacetate at 8% solids content. The charge generating dispersion was roll milled in a glass jar with ⅛ inch stainless steel shot for 5 days.

The photoreceptor was fabricated as follows in the recited layer sequence:
- a 40 mm diameter aluminum drum substrate having a surface that was rough lathed using a diamond tool;
- a charge blocking layer of zirconium silane (i.e., acetylacetone zirconium tributoxide and gamma-aminopropyltrimethoxysilane) that was formed by dip coating to a thickness of 0.9 micrometer;
- a charge generating layer formed by dip coating the inventive charge generating dispersion described above to a thickness of 1.8 micrometers; and
- a charge transport layer formed by dip coating a dispersion of the polycarbonate binder (Iupolon PCZ 400) and N,N'-diphenyl-N,N'-bis(3-methylphenyl)-(1,1'-biphenyl)-4,4'-diamine in a weight ratio of 60 (binder):40 (diamine) in tetrahydrofuran/monochlorobenzene (80:20 weight ratio) to a dried thickness of 22 micrometers. The amount of the diamine and the binder in the solvent was about 22% to about 24% solids content.

The sensitivity, dV/dX, of the photoreceptor was determined using an LED based photoreceptor scanner. The electrical performance was attained at nominal temperature and nominal humidity (22±3° C., 50±5% RH).

$V_{High}$ (test photoreceptor), electrical potential at dark area (0.93 second past charging)=$V_{High}$ (control of the same charge transporting layer thickness as the test photoreceptor) ±20 (−V).

$V_{Low}$ (test photoreceptor), electrical potential (0.93 second past charging) at 13 ergs/cm$^2$=$V_{Low}$ (control of the same charge transporting layer thickness as the test photoreceptor) ±10 (−V). The measured dV/dX is shown in Table 2.

COMPARATIVE EXAMPLE 1

The procedures of Example 1 were used except that the BUTVAR® B-79 (polyvinyl butyral resin) remained unmodified and the unmodified BUTVAR® B-79 replaced the inventive polymeric compound in fabricating the photoreceptor. The measured dV/dX is shown in Table 2.

EXAMPLE 2

The procedures of Example 1 were used except that BUTVAR® B-76 (polyvinyl butyral resin) having a hydroxyl content of 11.9% replaced BUTVAR® B-79. The inventive polymeric compound had a hydroxyl content of 4.8%. Acetic anhydride in the amount of 0.9 equivalent (2.51 g, 24.5 mmol) was used to treat the polyvinyl butyral resin. The measured dV/dX is shown in Table 2.

COMPARATIVE EXAMPLE 2

The procedures of Example 2 were used except that the BUTVAR® B-76 (polyvinyl butyral resin) remained unmodified and the unmodified BUTVAR® B-76 replaced the inventive polymeric compound in fabricating the photoreceptor. The measured dV/dX is shown in Table 2.

EXAMPLE 3

A 6.6 g sample of Monsanto BUTVAR® B-79 (polyvinyl butyral resin) having 11.5 weight percent ("wt %") hydroxyl content was dissolved in 75 ml pyridine and treated with 1 equivalent of acetic anhydride (1.72 g, 16.8 mmol). The reaction mixture was heated under a nitrogen atmosphere for 3 hours and then cooled to room temperature. The modified polyvinyl butyral resin (i.e, the inventive polymeric compound) was precipitated by addition to 1.5 liters of deionized water and filtered. After drying under vacuum, the inventive polymeric compound was taken up in 200 ml of warm tetrahydrofuran and reprecipitated into 1 liter of deionized water. Filtration then afforded the desired inventive polymeric compound. The degree of derivatization (i.e., converting the hydroxyl group of the polyvinyl alcohol moiety to an acetate group) was determined by the titrimetric method described by ASTM D1396-92, volume 06.03. The inventive polymeric compound had a hydroxyl content of 5.0 wt %.

A photoreceptor was prepared as follows.

A charge generating dispersion was composed of hydroxygallium phthalocyanine and inventive polymeric compound at a weight ratio of 64 (OHGaPc):36 (inventive polymeric compound) in n-butylacetate at 8% solids content. The charge generating dispersion was roll milled in a glass jar with 1/8 inch stainless steel shot for 5 days.

The photoreceptor was fabricated as follows in the recited layer sequence:
- a 40 mm diameter aluminum drum substrate having a surface that was lathed to a mirror like finish using a diamond tool;
- a charge blocking layer of zirconium tributoxide, gamma amino propyltriethoxy silane, and polyvinyl butyral resin (e.g., BM-STM available from Sekisui Chemical Company) where the proportions of these three components are 2 parts of the zirconium tributoxide to 1 part gamma amino propyltriethoxy silane by mole ratio, and 90 parts by weight of the above mixture of the zirconium tributoxide and gamma amino propyltriethoxy silane to 10 parts by weight of the polyvinyl butyral resin; the blocking layer was formed by dip coating to a thickness of 0.9 micrometer;
- a charge generating layer formed by dip coating the inventive charge generating dispersion described above to a thickness of 1.8 micrometers; and
- a charge transport layer formed by dip coating a dispersion of the polycarbonate binder (Iupolon PCZ 400) and N,N'-diphenyl-N,N'-bis(3-methylphenyl)-(1,1'-biphenyl)-4,4'-diamine in a weight ratio of 60 (binder):40 (diamine) in tetrahydrofuran/monochlorobenzene (80:20 weight ratio) to a dried thickness of 22 micrometers. The amount of the diamine and the binder in the solvent was about 22% to about 24% solids content.

The sensitivity, dV/dX, of the photoreceptor was determined using using the equipment and procedures described in Example 1. The measured dV/dX is shown in Table 2.

EXAMPLE 4

The procedures of Example 3 were used except that a 10 g sample of Monsanto BUTVAR® B-76 (polyvinyl butyral resin) having 11.9 weight percent ("wt %") hydroxyl content was dissolved in 75 ml pyridine and treated with 2 equivalents of acetic anhydride (5.57 g, 54.5 mmol). The inventive polymeric compound had a hydroxyl content of 0%. The measured dV/dX is shown in Table 2.

COMPARATIVE EXAMPLE 3

The procedures of Example 3 were used except that the BUTVAR® B-79 (polyvinyl butyral resin) remained unmodified and the unmodified BUTVAR® B-79 replaced the inventive polymeric compound in fabricating the photoreceptor. The measured dV/dX is shown in Table 2.

TABLE 2

| Examples | Wt % OH | dV/dX |
|---|---|---|
| Example 1 | 0.70 | 116 |
| Comp. Example 1 | 11.4 | 60 |
| Example 2 | 4.8 | 84 |
| Comp. Example 2 | 11.9 | 58 |
| Example 3 | 5.0 | 328 |
| Example 4 | 0 | 338 |
| Comp. Example 3 | 11.5 | 303 |

The above data indicate that the electrical performance of the photoreceptors is significantly enhanced with better sensitivity, dV/dX, as the level of the hydroxyl groups in the polyvinyl alcohol moiety is reduced. In embodiments of the present invention, sensitivity exists in an inverse relationship with the hydroxyl content, perhaps in a linearly proportional inverse relationship, where decreasing hydroxyl content increases the photoreceptor sensitivity. Thus, compared with the photoreceptor sensitivity provided by using a conventional polyvinyl butyral resin, increased sensitivity can occur for a photoreceptor employing the inventive polymeric compound at a hydroxyl content above 5% by weight such as up to about 6%, up to about 7%, or up to about 8% by weight as long as the inventive polymeric compound has a lower hydroxyl content than the unmodified conventional polyvinyl butyral resin.

It was surprisingly discovered that the inventive charge generating dispersions (i.e., Examples 1, 2, 3, and 4) exhibited satisfactory dispersion qualities even at reduced hydroxyl content. Prior to the present invention, it was believed by the inventors that good dispersion quality was achieved by interaction of the hydrogen on the hydroxyl group with the charge generating pigment and thus reducing the hydroxyl content of conventional polyvinyl butyral resins may have an adverse effect on the dispersion quality of the charge generating dispersions containing the modified polyvinyl butyral resin. To the surprise of the inventors, the inventive charge generating dispersions exhibited satisfactory dispersion qualities even at 0% by weight hydroxyl content.

Other modifications of the present invention may occur to those skilled in the art based upon a reading of the present disclosure and these modifications are intended to be included within the scope of the present invention.

We claim:

1. A method of preparing a binder comprising: selecting a polymer including a polyvinyl butyral moiety, a polyvinyl alcohol moiety, and an optional polyvinyl acetate moiety, wherein the polyvinyl alcohol moiety has a hydroxyl content of a first value, and decreasing the hydroxyl content to a lower second value that ranges from 0% by weight to less than the first value by reacting the polymer with a hydroxyl converting reactant to convert a portion of the repeating units of the polyvinyl alcohol moiety to a modified polyvinyl moiety of the formula

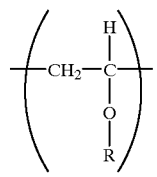

where R is an organic substituent, thereby resulting in a polymeric compound including the polyvinyl butyral moiety, the polyvinyl alcohol moiety having the hydroxyl content of the lower second value, the optional polyvinyl acetate moiety, and the modified polyvinyl moiety.

2. The method of claim 1, wherein the second value of the hydroxyl content ranges from 0% to about 5% by weight.

3. The method of claim 1 wherein the second value of the hydroxyl content ranges from 0% to about 1% by weight.

4. The method of claim 1, wherein the hydroxyl converting reactant is selected from the group consisting of: a carboxylic acid anhydride, a carboxylic acid halide, a dihydropyran, an alkyl halide, and a tosylate.

5. The method of claim 4, wherein the carboxylic acid anhydride is acetic anhydride or butyric anhydride; wherein the carboxylic acid halide is acetyl chloride or butyryl chloride; wherein the dihydropyran is 3,4-dihydro-2H-pyran; wherein the alkyl halide is butyl chloride, butyl bromide, or butyl iodide; and the tosylates is p-toluenesulfonylchloride.

6. The method of claim 1, wherein the first value of the hydroxyl content is at least about 8%.

7. The method of claim 1, further comprising: depositing a coating composition including a charge generating material and the polymeric compound onto a substrate.

8. The method of claim 1, wherein the —OR is acetate, whereby the modified polyvinyl moiety has the same structure as the polyvinyl acetate moiety.

9. A photoreceptor comprising:

(a) a substrate;

(b) a charge generating layer including a charge generating material and a polymeric compound including a polyvinyl butyral moiety, a polyvinyl alcohol moiety, an optional polyvinyl acetate moiety, and a modified polyvinyl moiety of the formula

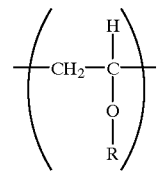

where R is an organic substituent, wherein the polyvinyl alcohol moiety has a hydroxyl content that ranges from 0% to about 1% by weight; and (c) a charge transport layer.

10. The photoreceptor of claim 9, wherein R is selected from the group consisting of: an alkyl group having from 1 to 6 carbon atoms; a tetrahydropyranyl group; and an acyl group of the formula —(CO)R' where R' has from 1 to 12 carbon atoms.

11. The photoreceptor of claim 10, wherein the R' is an alkyl group or an aryl group.

12. The photoreceptor of claim 9, wherein the charge generating material is a perylene or a phthalocyanine.

13. The photoreceptor of claim 9, wherein the polyvinyl alcohol moiety is present and the modified polyvinyl moiety has a different structure from the polyvinyl acetate moiety.

14. The photoreceptor of claim 9, wherein the —OR is the acetate, thereby the modified polyvinyl moiety having the same structure as the polyvinyl acetate moiety.

* * * * *